(12) United States Patent
Fokken et al.

(10) Patent No.: US 7,572,389 B2
(45) Date of Patent: *Aug. 11, 2009

(54) FINELY DISTRIBUTED STABILISING COMPOSITION FOR POLYMERS CONTAINING HALOGEN

(75) Inventors: Stefan Fokken, Biberbach (DE); Jürgen Hauk, Freising (DE); Manfred Weigl, Heimstetten (DE)

(73) Assignee: Baerlocher GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/103,795

(22) Filed: Apr. 12, 2005

(65) Prior Publication Data

US 2005/0215688 A1    Sep. 29, 2005

Related U.S. Application Data

(60) Division of application No. 10/719,678, filed on Nov. 21, 2003, now Pat. No. 6,890,453, which is a continuation of application No. PCT/EP02/05416, filed on May 16, 2002.

(30) Foreign Application Priority Data

May 21, 2001    (DE)    ................ 101 24 734

(51) Int. Cl.
*C08K 3/16*    (2006.01)
*C01B 11/14*    (2006.01)
*C01B 11/18*    (2006.01)

(52) U.S. Cl. .................... 252/182.29; 252/182.32; 252/187.31; 524/401; 524/436; 524/402; 423/475; 423/476

(58) Field of Classification Search .......... 252/187.31
See application file for complete search history.

(56) References Cited

U.S. PATENT DOCUMENTS

| | | | | |
|---|---|---|---|---|
| 2,993,946 A | * | 7/1961 | Lozier | 429/113 |
| 3,267,062 A | * | 8/1966 | Prill et al. | 524/112 |
| 3,307,903 A | * | 3/1967 | Lazari | 423/476 |
| 3,355,328 A | * | 11/1967 | Meyers et al. | 429/101 |
| 3,615,179 A | * | 10/1971 | Rosenberg et al. | 423/476 |
| 4,120,866 A | | 10/1978 | Winkler | |
| 4,659,764 A | * | 4/1987 | Isao et al. | 524/399 |
| 4,704,331 A | * | 11/1987 | Robins et al. | 428/414 |
| 4,751,261 A | | 6/1988 | Miyata et al. | |
| 4,861,816 A | * | 8/1989 | Kobayashi et al. | 524/204 |
| 5,004,776 A | * | 4/1991 | Tadenuma et al. | 524/377 |
| 5,034,443 A | | 7/1991 | Bae et al. | |
| 5,177,135 A | | 1/1993 | Wehner et al. | |
| 5,190,700 A | * | 3/1993 | Watanabe et al. | 252/609 |
| 5,225,108 A | | 7/1993 | Bae et al. | |
| 5,232,967 A | | 8/1993 | Worschech et al. | |
| 5,241,094 A | | 8/1993 | Razvan et al. | |
| 5,312,941 A | | 5/1994 | Razvan et al. | |
| 5,356,982 A | | 10/1994 | Razvan et al. | |
| 5,840,792 A | | 11/1998 | Machimura et al. | |
| 5,925,696 A | | 7/1999 | Wehner et al. | |
| 6,194,494 B1 | | 2/2001 | Wehner et al. | |
| 6,261,530 B1 | * | 7/2001 | Breuer et al. | 423/430 |

FOREIGN PATENT DOCUMENTS

| | | |
|---|---|---|
| DE | 42 04 887 A1 | 8/1993 |
| DE | 101 09 366 A1 | 9/2002 |
| EP | 0 212 559 A2 | 3/1987 |
| EP | 0 256 872 B2 | 8/1987 |
| EP | 0 330 411 A1 | 8/1989 |
| EP | 0 344 321 A1 | 12/1989 |
| EP | 0 457 471 A2 | 11/1991 |
| EP | 0 511 405 A1 | 11/1992 |
| EP | 0 273 766 B1 | 3/1995 |
| EP | 0 742 259 B1 | 11/1996 |
| EP | 1 046 668 A3 | 10/2000 |
| GB | 1 548 037 | 7/1979 |
| JP | 50039342 A | 4/1975 |
| JP | 61009451 A | 1/1986 |
| JP | 62273243 A | 11/1987 |
| JP | 63-277259 A | 11/1988 |
| JP | 01-308442 A | 12/1989 |
| JP | 02073259 A | 3/1990 |
| JP | 05156104 A | 6/1993 |
| JP | 05287144 A2 | 11/1993 |
| JP | 07062181 A | 3/1995 |
| JP | 2000273259 A | 10/2000 |
| WO | WO-92/15525 A1 | 9/1992 |
| WO | WO-94/24200 A1 | 10/1994 |
| WO | WO-99/55777 A1 | 11/1999 |
| WO | WO-02/068526 A1 | 9/2002 |

OTHER PUBLICATIONS

Naiini et al., "Triethanolamine Complexes of H+, Li+, Na+, $Sr^{2+}$, and $Ba^{2+}$ Perchlorates," *Inorg. Chem.*, 1994, vol. 33, pp. 2137-2141.
Titow, PVC Technology, 1984, pp. 165-170, $4^{th}$ Edition, Elsevier Publishers, London, United Kingdom.
Wickson, Handbook of Polyvinyl Chloride Formulating, 1993, pp. 393-449, John Wiley & Sons, Inc., New York, USA.
International Search Report from corresponding International Application No. PCT/EP02/05416 dated Sep. 18, 2002.

* cited by examiner

*Primary Examiner*—Joseph D Anthony
(74) *Attorney, Agent, or Firm*—Fish & Richardson P.C.

(57) ABSTRACT

The present invention is a stabiliser composition for halogen-containing polymers, comprising a salt of a halogen-containing oxy acid and an inorganic or organic acid or an inorganic base. The present invention relates also to a process for the preparation of such stabiliser compositions and to halogen-containing polymers comprising such stabiliser compositions.

14 Claims, No Drawings

FINELY DISTRIBUTED STABILISING COMPOSITION FOR POLYMERS CONTAINING HALOGEN

CROSS-REFERENCE TO RELATED APPLICATIONS

This is a divisional application of U.S. application Ser. No. 10/719,678, filed Nov. 21, 2003 now U.S. Pat. No. 6,890,453, which is a continuation application of PCT/EP02/05416, filed May 16, 2002, both of which are incorporated herein by reference in their entirety. The present application further claims the benefit of German Priority Application No. 101 24 734.6, filed May 21, 2001.

FIELD OF THE INVENTION

The present invention relates to a stabiliser composition for halogen-containing polymers, comprising a salt of a halogen-containing oxy acid and an inorganic or organic acid or an inorganic base. The present invention relates also to a process for the preparation of such stabiliser compositions and to halogen-containing polymers comprising such stabiliser compositions.

BACKGROUND OF THE INVENTION

It is known that halogen-containing plastics have a tendency to undergo undesirable decomposition and breakdown reactions under thermal stress during processing or during long-term use. The breakdown of halogenated polymers, especially in the case of PVC, results in the formation of hydrochloric acid, which is eliminated from the polymer strand, resulting in a discoloured, unsaturated plastics having colour-imparting polyene sequences.

Especially in the case of moulded articles that are exposed to light, fluctuating temperatures or other external influences, as the period of use increases changes occur to the colour and material properties which may eventually lead to the moulded article's becoming unusable.

Various stabiliser systems have been proposed for stabilising halogen-containing polymers in respect of long-term damage caused by the action of light or heat. For example, systems are described in the prior art that comprise perchlorate salts for stabilising halogen-containing polymers. A problem that arises when perchlorate salts are used, however, is that those sensitive oxidising agents have to be handled very cautiously. For that reason, the user will have certain reservations about the use of perchlorate salts in stabiliser compositions. Various solutions have therefore been proposed by means of which such perchlorate-containing stabiliser compositions can be improved in respect of their handleability.

For example, EP-B 0 457 471 describes a stabiliser composition comprising perchlorate, calcium silicate and calcium carbonate. For the preparation of the described stabiliser compositions, an aqueous solution of sodium perchlorate is mixed with calcium silicate or with a mixture of calcium silicate and calcium carbonate. A problem that arises with the described stabiliser compositions is that they still contain relatively large crystallites of sodium perchlorate. Such crystallites can still constitute a hazard during handling. Furthermore, such stabiliser compositions cannot be distributed sufficiently homogeneously in a halogen-containing polymer. In addition, the presence of calcium silicate limits the stabiliser action in comparison with other calcium compounds. Moreover, calcium silicate exhibits a high Mohs hardness, so that processing apparatus can become permanently damaged.

DE 689 12 616 T2 discloses pulverulent flame retardants having a content of antimony pentoxide for halogen-containing vinyl resins. The specification describes compositions for flame retardants that comprise sodium perchlorate and also hydroxides or salts of an alkali metal. According to embodiments 2 and 4, the described compositions are dried and can then be ground in a pin disc mill.

DE 696 04 880 T2 relates to a stabiliser for halogen-containing resins and processes for the preparation thereof, a halogen-containing resin composition and a complex hydroxide salt. The stabiliser for the halogen-containing resins may comprise, for example, a complex hydroxide salt of a perchloric acid and inorganic metal hydroxides.

There was therefore a need for stabiliser compositions comprising a salt of a halogen-containing oxy acid, where the stabiliser compositions comprise the salt of the halogen-containing oxy acid as finely divided as possible.

The problem underlying the present invention is therefore to provide such stabiliser compositions and processes for their preparation.

The problems underlying the invention are solved by a stabiliser composition and a process for its preparation as described in the following text.

SUMMARY OF THE INVENTION

The present invention therefore relates to a stabiliser composition, at least comprising a salt of a halogen-containing oxy acid of the general formula $M(ClO_4)_k$, wherein M is Li, Na, K, Mg, Ca, Sr, Zn, Al, La, Ce or an ammonium cation of the general formula $NR_4^+$, the radicals R are each independently of the others H or a linear or branched alkyl radical having from 1 to about 10 carbon atoms and k, according to the valency of M, is the number 1, 2 or 3, and an inorganic or organic acid or an inorganic base, where the composition, based on the total content of salt of a halogen-containing oxy acid, contains less than 10% crystallites of the salt having a crystallite size greater than 3 μm.

DETAILED DESCRIPTION OF THE PREFERRED EMBODIMENTS

A "stabiliser composition" is to be understood in the context of the present invention as being a composition that can be used for the stabilisation of halogen-containing polymers. For achieving that stabilisation effect, a stabiliser composition according to the invention is generally mixed with a halogen-containing polymer to be stabilised and then processed. It is equally possible, however, for a stabiliser composition according to the invention to be mixed with the halogen-containing polymer to be stabilised during processing.

A stabiliser composition according to the invention has at least two constituents. As a first constituent, a stabiliser composition according to the invention comprises at least one salt of a halogen-containing oxy acid of the general formula $M(ClO_4)_k$, wherein M is Li, Na, K, Mg, Ca, Sr, Zn, Al, La, Ce or an ammonium cation of the general formula $NR_4^+$, wherein the radicals R are each independently of the others H or a linear or branched alkyl radical having from 1 to about 10 carbon atoms. The index k, according to the valency of M, is the number 1, 2 or 3.

A stabiliser composition according to the invention may, for example, comprise only one salt of a halogen-containing oxy acid. In the context of the present invention it is equally possible, however, for a stabiliser composition according to the invention to comprise a mixture of two or more salts of halogen-containing oxy acids. Within the scope of a preferred embodiment of the present invention, a stabiliser composition according to the invention comprises sodium perchlorate.

The content of salts of a halogen-containing oxy acid or of a mixture of two or more halogen-containing oxy acids in the stabiliser composition according to the invention is from approximately 0.01 to approximately 50% by weight, especially from approximately 0.05 to approximately 20% by weight. Examples of contents of salts of a halogen-containing oxy acid or of a mixture of two or more such salts are from approximately 0.1 to approximately 5% by weight or from approximately 0.2 to approximately 1.5% by weight.

The salts of the halogen-containing oxy acids are present in a stabiliser composition according to the invention in especially finely divided form. Within the scope of a preferred embodiment of the present invention, less than 10% by weight of the salts of the halogen-containing oxy acid or the mixture of two or more such salts have crystallites of a size greater than 3 μm. It follows that at least approximately 90% by weight of the salts have crystallites of a size smaller than 3 μm.

Within the scope of a preferred embodiment of the present invention, a stabiliser composition according to the invention comprises a salt of a halogen-containing oxy acid or of a mixture of two or more halogen-containing oxy acids, wherein less than approximately 10% by weight of the salt or the salt mixture is in the form of crystallites of a size greater than 1 μm, preferably of a size greater than 500 nm. Within the scope of a further preferred embodiment of the present invention, a stabiliser composition according to the invention is substantially free of crystallites of salts of halogen-containing oxy acids having a crystallite size greater than approximately 250 nm. Within the scope of especially preferred embodiments of the present invention, a stabiliser composition according to the invention comprises crystallites of salts of halogen-containing oxy acids having a crystallite size greater than approximately 100 nm or greater than approximately 50 nm or greater than approximately 20 nm or greater than approximately 10 or approximately 5 nm.

The crystallite sizes of salts of halogen-containing oxy acids, as mentioned in the context of the present text, can be determined in principle by any methods of determining particle sizes. Suitable in principle are, for example, screening methods, sedimentation methods or methods based on the diffraction or refraction of electromagnetic waves, especially of light. Also suitable are electron-microscopic methods, such as scanning electron microscopy or transmission electron microscopy.

Within the scope of a further preferred embodiment of the present invention, a stabiliser composition according to the invention is free of crystallites, such as are detectable by X-ray diffractometric methods. A stabiliser composition according to the invention therefore preferably comprises crystallites having sizes beyond the detection limit of such methods. The size of such crystallites is preferably below approximately 10 nanometers, preferably below approximately 5 nanometers.

In addition to a salt of a halogen-containing oxy acid or a mixture of two or more such salts, a stabiliser composition according to the invention comprises an inorganic or organic acid or an inorganic base. The inorganic or organic acids or the inorganic bases are solid compounds capable of forming preferably solid acid or base anhydrides. There are suitable, for example, organic acids capable of anhydride formation, for example maleic acid, phthalic acid and succinic acid.

Also suitable, for example, are inorganic acids that are capable of anhydride formation, for example boric acid.

Especially suitable as constituent of the stabiliser composition according to the invention, however, are inorganic bases capable of forming anhydrides. Suitable inorganic bases are the hydroxides of elements of main groups I and II of the Periodic Table and the hydroxides of elements of subgroup I of the Periodic Table. Magnesium hydroxide, calcium hydroxide, barium hydroxide and strontium hydroxide are especially suitable.

A stabiliser composition according to the invention may in the context of the present invention comprise, for example, only one organic or inorganic acid or one inorganic base. In the context of the present invention, however, it is also possible for a stabiliser composition according to the invention to comprise a mixture of two or more organic acids or two or more inorganic acids or a mixture of two or more inorganic bases or a mixture of one or more organic acids or one or more inorganic acids.

Within the scope of a preferred embodiment of the present invention, a stabiliser composition according to the invention comprises as inorganic base calcium hydroxide or magnesium hydroxide, especially calcium hydroxide.

In addition to the mentioned acids or bases or the mixtures of acids and bases and the salts of halogen-containing oxy acids, a stabiliser composition according to the invention can also comprise further additives.

Suitable additives include, for example, amino alcohols. Suitable amino alcohols in the context of the present invention are in principle any compounds having at least one OH group and a primary, secondary or tertiary amino group or a combination of two or more of the mentioned amino groups. In the context of the present invention, in principle both solid and liquid amino alcohols are suitable as a constituent of the stabiliser compositions according to the invention. In the context of the present invention, however, the content of liquid amino alcohols is, for example, so chosen that the entire stabiliser composition is substantially in solid form.

Within the scope of a further preferred embodiment of the present invention, a stabiliser composition according to the invention contains a maximum of approximately 5% by weight of liquid amino alcohol or a mixture of two or more liquid amino alcohols, but preferably the content is lower, for example 1% by weight or less. Within the scope of an especially preferred embodiment of the present invention, a stabiliser composition according to the invention contains no liquid amino alcohols.

Amino alcohols suitable for use in the context of the present invention have, within the scope of a preferred embodiment of the present invention, a melting point higher than approximately 30° C., especially higher than approximately 50° C. Suitable amino alcohols are, for example, mono- or poly-hydroxy compounds which are based on linear or branched, saturated or unsaturated aliphatic mono- or poly-amines.

There are suitable in this connection, for example, OH-group-carrying derivatives of primary mono- or poly-amino compounds having from 2 up to about 40, for example from 6 up to about 20, carbon atoms. Examples of such derivatives are OH-group-carrying derivatives of ethylamine, n-propylamine, isopropylamine, sec-propylamine, tert-butylamine, 1-aminoisobutane, substituted amines having from 2 to about 20 carbon atoms, such as 2-(N,N-dimethylamino)-1-aminoethane. Suitable OH-group-carrying derivatives of diamines are, for example, those based on diamines having a molecular weight of from approximately 32 to approximately 200 g/mol, the corresponding diamines having at least two primary, two secondary, or one primary and one secondary amino group(s). Examples thereof are diaminoethanes, the isomeric diaminopropanes, the isomeric diaminobutanes, the isomeric diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines, such as diethylenetriamine or 1,8-diamino-4-aminomethyloctane, triethylamine, tributylamine, dimethylbenzylamine, N-ethyl-, N-methyl-, N-cyclohexyl-morpholine, dimethylcyclohexylamine, dimorpholinodiethyl ether, 1,4-diazabicyclo[2,2,2]octane, 1-azabicyclo[3,3,0]octane, N,N,N',N'-tetramethylethylenediamine, N,N,N',N'-tetramethylbutanediamine, N,N,N',N'-tetramethyl-1,6-hexanediamine, pentamethyldiethylenetriamine, tetramethyldiaminoethyl ether, bis(dimethylaminopropyl)urea, N,N'-dimethyl-piperazine, 1,2-dimethylimidazole and di(4-N,N-dimethylaminocyclohexyl)methane.

Especially suitable are aliphatic amino alcohols having from 2 to about 40, preferably from 6 to about 20, carbon atoms, for example 1-amino-3,3-dimethyl-pentan-5-ol, 2-aminohexane-2',2"-diethanolamine, 1-amino-2,5-dimethylcyclohexan-4-ol, 2-aminopropanol, 2-aminobutanol, 3-aminopropanol, 1-amino-2-propanol, 2-amino-2-methyl-1-propanol, 5-aminopentanol, 3-aminomethyl-3,5,5-trimethylcyclohexanol, 1-amino-1-cyclopentane-methanol, 2-amino-2-ethyl-1,3-propanediol, 2-(dimethylaminoethoxy)ethanol, aromatic-aliphatic or aromatic-cycloaliphatic amino alcohols having from 6 to about 20 carbon atoms, there coming into consideration as aromatic structures heterocyclic or isocyclic ring systems such as naphthalene or especially benzene derivatives, such as 2-aminobenzyl alcohol, 3-(hydroxymethyl)aniline, 2-amino-3-phenyl-1-propanol, 2-amino-1-phenylethanol, 2-phenylglycinol or 2-amino-1-phenyl-1,3-propanediol, and also mixtures of two or more such compounds.

Within the scope of an especially preferred embodiment of the present invention, the amino alcohols used are heterocyclic compounds having a cyclic ring system containing amino groups, the OH groups being bonded to the ring either directly or preferably by way of spacers.

Within the scope of an especially preferred embodiment of the present invention there are used heterocyclic amino alcohols having at least 2, preferably at least 3, amino groups in the ring. As central ring component of the amino alcohols suitable for use according to the invention there are especially suitable the trimerisation products of isocyanates.

Special preference is given to hydroxyl-group-containing isocyanurates of the general formula I

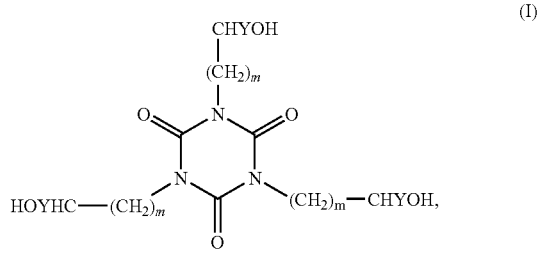

wherein the groups Y and the indices m are identical or different and m is an integer from 0 to 20 and Y is a hydrogen atom or a linear or branched, saturated or unsaturated alkyl group having from 1 to about 10 carbon atoms. In the context of the present invention special preference is given to the use of tris(hydroxymethyl)isocyanurate (THEIC) as constituent of the stabiliser compositions according to the invention.

A stabiliser composition according to the invention may, for example, comprise only one amino alcohol. In the context of the present invention, however, a stabiliser composition according to the invention can equally comprise a mixture of two or more different amino alcohols.

Also suitable as additives in the context of the present invention are compounds having a structural element of the general formula II

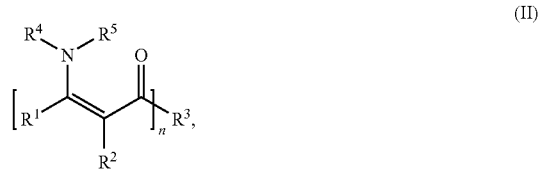

wherein n is a number from 1 to 100,000, the radicals $R^4$, $R^5$, $R^1$ and $R^2$ are each independently of the others hydrogen, an unsubstituted or substituted linear or branched, saturated or unsaturated aliphatic alkyl radical having from 1 to 44 carbon atoms, an unsubstituted or substituted saturated or unsaturated cycloalkyl radical having from 6 to 44 carbon atoms, an unsubstituted or substituted aryl radical having from 6 to 44 carbon atoms or an unsubstituted or substituted aralkyl radical having from 7 to 44 carbon atoms, or the radical $R^1$ is an unsubstituted or substituted acyl radical having from 2 to 44 carbon atoms or the radicals $R^1$ and $R^2$ are linked to form an aromatic or heterocyclic system and wherein the radical $R^3$ is hydrogen, an unsubstituted or substituted, linear or branched, saturated or unsaturated aliphatic alkyl or alkylene radical or oxyalkyl or oxyalkylene radical or mercaptoalkyl or mercaptoalkylene radical or aminoalkyl or aminoalkylene radical having from 1 to 44 carbon atoms, an unsubstituted or substituted saturated or unsaturated cycloalkyl or cycloalkylene radical or oxycycloalkyl or oxycycloalkylene radical or mercaptocycloalkyl or mercaptocycloalkylene radical or aminocycloalkyl or aminocycloalkylene radical having from 6 to 44 carbon atoms or an unsubstituted or substituted aryl or arylene radical having from 6 to 44 carbon atoms, or an ether or thioether radical having from 1 to 20 O or S atoms or O and S atoms, or is a polymer that is bonded to the structural element in brackets by way of O, S, NH, $NR^4$ or $CH_2C(O)$, or the radical $R^3$ is so linked to the radical $R^1$ that in total an unsubstituted or substituted, saturated or unsaturated heterocyclic ring system having from 4 to 24 carbon atoms is formed, or a mixture of two or more of the compounds of the general formula I.

Within the scope of a preferred embodiment of the present invention, as the compound of the general formula I there is used a compound based on an α,β-unsaturated β-aminocarboxylic acid, especially a compound based on β-aminocrotonic acid. Especially suitable are the esters or thioesters of corresponding aminocarboxylic acids with monovalent or polyvalent alcohols or mercaptans wherein X in each of the mentioned cases is O or S.

When the radical $R^3$ together with X is an alcohol or mercaptan radical, such a radical can be formed, for example, from methanol, ethanol, propanol, isopropanol, butanol, 2-ethylhexanol, isooctanol, isononanol, decanol, lauryl alcohol, myristyl alcohol, palmityl alcohol, stearyl alcohol, ethylene glycol, propylene glycol, 1,3-butanediol, 1,4-butanediol, 1,6-hexanediol, 1,10-decanediol, diethylene glycol, thio-diethanol, trimethylolpropane, glycerol, tris(2-hydroxymethyl) isocyanurate, triethanolamine, pentaerythritol, di-trimethylolpropane, diglycerol, sorbitol, mannitol, xylitol, di-pentaerythritol and also the corresponding mercapto derivatives of the mentioned alcohols.

Within the scope of an especially preferred embodiment of the present invention, as the compound of the general formula II there is used a compound in which $R^1$ is a linear alkyl radical having from 1 to 4 carbon atoms, $R^2$ is hydrogen and $R^3$ is a linear or branched, saturated, mono- to hexa-valent alkyl or alkylene radical having from 2 to 12 carbon atoms or a linear, branched or cyclic 2- to 6-valent ether alcohol radical or thioether alcohol radical.

Suitable compounds of the general formula II include, for example, β-aminocrotonic acid stearyl ester, 1,4-butanediol di(β-aminocrotonic acid) ester, thio-diethanol-β-aminocrotonic acid ester, trimethylolpropane tri-β-aminocrotonic acid ester, pentaerythritol-tetra-β-aminocrotonic acid ester, dipentaerythritol-hexa-β-aminocrotonic acid ester and the like. The mentioned compounds can be present in a stabiliser composition according to the invention alone or as a mixture of two or more thereof.

Compounds that are likewise suitable as compounds of the general formula II in the context of the present invention are aminouracil compounds of the general formula III

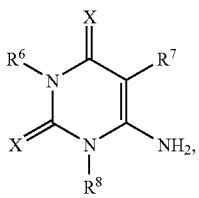

(III)

wherein the radicals $R^6$ and $R^7$ have the meanings already given above and the radical $R^8$ is hydrogen, an unsubstituted or substituted linear or branched, saturated or unsaturated aliphatic hydrocarbon radical having from 1 to 44 carbon atoms, an unsubstituted or substituted saturated or unsaturated cycloaliphatic hydrocarbon radical having from 6 to 44 carbon atoms or an unsubstituted or substituted aromatic hydrocarbon radical having from 6 to 44 carbon atoms.

The compound according to formula III thus falls within the scope of the compounds according to formula I wherein n in the general formula I is 1 and the radicals $R^1$ and $R^3$ according to the general formula I are linked to form the structural element of the general formula IV

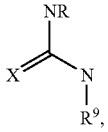

(IV)

wherein X is S or O. $R^1$ in the case of a compound of the general formula IV is therefore N—$R^9$, while $R^3$ is —RN—C=X and the two radicals are covalently linked by way of a N—C bond to form a heterocyclic ring.

In the context of the present invention it is preferable to use compounds of the general formula IV wherein $R^9$ is hydrogen.

Within the scope of a further preferred embodiment of the present invention, in the stabiliser compositions according to the invention there are used compounds of the general formula III wherein $R^6$ and $R^8$ are a linear or branched alkyl radical having from 1 to 6 carbon atoms, for example methyl, ethyl, propyl, butyl, pentyl or hexyl, an OH-group-substituted linear or branched alkyl radical having from 1 to 6 carbon atoms, for example hydroxymethyl, hydroxyethyl, hydroxypropyl, hydroxybutyl, hydroxypentyl or hydroxyhexyl, an aralkyl radical having from 7 to 9 carbon atoms, for example benzyl, phenylethyl, phenylpropyl, dimethylbenzyl or phenylisopropyl, it being possible for the mentioned aralkyl radicals to be substituted, for example, by halogen, hydroxy or methoxy, or an alkenyl radical having from 3 to 6 carbon atoms, for example vinyl, alkyl, methallyl, 1-butenyl or 1-hexenyl.

Within the scope of a preferred embodiment of the present invention, in the stabiliser compositions according to the invention there are used compounds of the general formula III wherein $R^6$ and $R^8$ are hydrogen, methyl, ethyl, n-propyl, isopropyl, n-, iso-, sec- or tert-butyl.

Also suitable as compounds of the general formula I are, for example, compounds in which the radicals $R^1$ and $R^2$ are linked to form an aromatic or heteroaromatic system, for example aminobenzoic acid, aminosalicylic acid or aminopyridinecarboxylic acid and suitable derivatives thereof.

Within the scope of a preferred embodiment of the present invention, a stabiliser composition according to the invention comprises a compound of the general formula I or a mixture of two or more compounds of the general formula I, for example a compound of the general formula II, in an amount of from approximately 0.1 to approximately 99.5% by weight, especially from approximately 5 to approximately 50% by weight or from approximately 5 to approximately 25% by weight.

Further suitable additives in the context of the present invention are, for example, compounds having at least one mercapto-functional, sp²-hybridised carbon atom. Compounds having at least one mercapto-functional, sp²-hybridised carbon atom are to be understood in the context of the present invention as being in principle any compounds having a structural element Z=CZ—SH or a structural element $Z_2$C=S, it being possible for the two structural elements to be tautomeric forms of a single compound. The sp²-hybridised carbon atom may be a constituent of an unsubstituted or substituted aliphatic compound or a constituent of an aromatic system. Suitable types of compound are, for example, thiocarbamic acid derivatives, thiocarbamates, thiocarboxylic acids, thiobenzoic acid derivatives, thioacetone derivatives and thiourea or thiourea derivatives. Suitable compounds having at least one mercapto-functional, sp²-hybridised carbon atom are mentioned, for example, in the non-prior-published German patent application having the file reference 101 09 366.7.

Within the scope of a preferred embodiment of the present invention, thiourea or a thiourea derivative is used as the compound having at least one mercapto-functional, sp²-hybridised carbon atom.

Examples of additives also suitable for the stabiliser compositions according to the invention are carbazole or carbazole derivatives or mixtures of two or more thereof.

Further suitable additives are, for example, 2,4-pyrrolidinedione or derivatives thereof, such as are mentioned, for example, in the non-prior-published German patent application having the file reference 101 09 366.7.

Also suitable as additives are, for example, epoxy compounds. Examples of such epoxy compounds are epoxidised soybean oil, epoxidised olive oil, epoxidised linseed oil, epoxidised castor oil, epoxidised groundnut oil, epoxidised maize oil, epoxidised cottonseed oil, and also glycidyl compounds.

Glycidyl compounds contain a glycidyl group that is bonded directly to a carbon, oxygen, nitrogen or sulfur atom. Glycidyl or methylglycidyl esters are obtainable by reaction of a compound having at least one carboxyl group in the molecule and epichlorohydrin or glycerol dichlorohydrin or methyl-epichlorohydrin. The reaction is advantageously carried out in the presence of bases.

As compounds having at least one carboxyl group in the molecule there can be used, for example, aliphatic carboxylic acids. Examples of such carboxylic acids are glutaric acid, adipic acid, pimelic acid, suberic acid, azelaic acid, sebacic acid or dimerised or trimerised linoleic acid, acrylic acid, methacrylic acid, caproic acid, caprylic acid, lauric acid, myristic acid, palmitic acid, stearic acid or pelargonic acid and also the mono- or poly-carboxylic acids mentioned hereinbelow. Also suitable are cycloaliphatic carboxylic acids, such as cyclohexanecarboxylic acid, tetrahydrophthalic acid, 4-methyltetrahydrophthalic acid, hexahydrophthalic acid, endomethylenetetrahydrophtalic acid or 4-methylhexahydrophthalic acid. Also suitable are aromatic carboxylic acids, such as benzoic acid, phthalic acid, isophthalic acid, trimellitic acid or pyromellitic acid.

Glycidyl ethers or methylglycidyl ethers can be obtained by reaction of a compound having at least one free alcoholic OH group or a phenolic OH group and a suitably substituted epichlorohydrin under alkaline conditions or in the presence of an acidic catalyst and subsequent alkali treatment. Ethers of this type are derived, for example, from acyclic alcohols, such as ethylene glycol, diethylene glycol or higher poly(oxyethylene) glycols, propane-1,2-diol or poly(oxypropylene) glycols, butane-1,4-diol, poly(oxytetramethylene) glycols, pentane-1,5-diol, hexane-1,6-diol, hexane-2,4,6-triol, glycerol, 1,1,1-trimethylolpropane, bis-trimethylolpropane, pentaerythritol, sorbitol, and also from polyepichlorohydrins, butanol, amyl alcohol, pentanol, and also from monofunctional alcohols, such as isooctanol, 2-ethylhexanol, isodecanol or technical alcohol mixtures, for example technical fatty alcohol mixtures.

Suitable ethers are also derived from cycloaliphatic alcohols, such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohexan-3-ene, or they have aromatic nuclei, such as N,N-bis(2-hydroxyethyl) aniline. Suitable epoxy compounds can also be derived from mononuclear phenols, for example from phenol, resorcinol or hydroquinone, or they are based on polynuclear phenols, such as bis(4-hydroxyphenyl)methane, 2,2-bis(4-hydroxyphenyl) propane, 2,2-bis(3,5-dibromo-4-hydroxyphenyl)propane, 4,4'-dihydroxydiphenylsulfones, or on condensation products of phenol with formaldehyde obtained under acidic conditions, for example phenol novolaks.

Further terminal epoxides suitable as additives in the context of the present invention are, for example, glycidyl-1-naphthyl ether, glycidyl-2-phenyl phenyl ether, 2-diphenylglycidyl ether, N-(2,3-epoxypropyl)phthalimide or 2,3-epoxypropyl-4-methoxyphenyl ether.

Also suitable are N-glycidyl compounds, such as are obtainable by dehydrochlorination of the reaction products of epichlorohydrin with amines containing at least one amino hydrogen atom. Such amines are, for example, aniline, N-methylaniline, toluidine, n-butylamine, bis(4-aminophenyl) methane, m-xylylenediamine or bis(4-methylaminophenyl) methane.

Likewise suitable are S-glycidyl compounds, for example di-S-glycidyl ether derivatives, that are derived from dithiols, such as ethane-1,2-dithiol or bis(4-mercaptomethylphenyl) ether.

Especially suitable epoxy compounds are described, for example, on pages 3 to 5 of EP-A 1 046 668, reference being expressly made to the disclosure contained therein, which is to be regarded as part of the disclosure of this text.

Also suitable as additives in the context of the present invention are 1,3-dicarbonyl compounds, especially the β-diketones and β-keto esters. Suitable in the context of the present invention are dicarbonyl compounds of the general formula R'C(O)CHR''—C(O)R''', as described, for example, on page 5 of EP 1 046 668, to which reference is expressly made especially in respect of the radicals R', R'' and R''' and the disclosure of which is regarded as being part of the disclosure of this text. Especially suitable are, for example, acetyl acetone, butanoyl acetone, heptanoyl acetone, stearoyl acetone, palmitoyl acetone, lauroyl acetone, 7-tert-nonylthioheptanedione-2,4, benzoyl acetone, dibenzoylmethane, lauroylbenzoylmethane, palmitoylbenzoyl methane, stearoylbenzoylmethane, isooctylbenzoylmethane, 5-hydroxycapronylbenzoylmethane, tribenzoylmethane, bis(4-methylbenzoyl)methane, benzoyl-p-chlorobenzoylmethane, bis(2-hydroxybenzoyl)methane, 4-methoxybenzoylbenzoylmethane, bis(4-methoxy-benzoyl)methane, benzoylformylmethane, benzoylacetylphenylmethane, 1-benzoyl-1-acetylnonane, stearoyl-4-methoxybenzoylmethane, bis(4-tert-butylbenzoyl)methane, benzoylphenylacetylmethane, bis (cyclohexanoyl)methane, dipivaloylmethane, 2-acetylcyclopentanone, 2-benzoylcyclopentanone, diacetoacetic acid methyl, ethyl, butyl, 2-ethylhexyl, dodecyl or octadecyl ester and also propionyl or butyryl acetic acid esters having from 1 to 18 carbon atoms, and also stearoyl acetic acid ethyl, propyl, butyl, hexyl or octyl esters or polynuclear β-keto esters, as described in EP-A 433 230, to which reference is expressly made, or dehydracetic acid and also the zinc, magnesium or alkali salts thereof or the alkali, alkaline earth or zinc chelates of the mentioned compounds insofar as they exist.

1,3-Diketo compounds can be present in a stabiliser composition according to the invention in an amount of up to approximately 20% by weight, for example up to approximately 10% by weight.

Polyols are also suitable as additives in the context of the stabiliser composition according to the invention. Suitable polyols are, for example, pentaerythritol, dipentaerythritol, tripentaerythritol, bistrimethylolpropane, inositol, polyvinyl alcohol, bistrimethyloletane, trimethylolpropane, sorbitol, maltitol, isomaltitol, lactitol, lycasine, mannitol, lactose, leucrose, tris(hydroxymethyl) isocyanurate, palatinite, tetramethylolcyclohexanol, tetramethylolcyclopentanol, tetramethylolcycloheptanol, glycerol, diglycerol, polyglycerol, thiodiglycerol or 1-0-α-D-glycopyranosyl-D-mannitol dihydrate.

The polyols suitable as additives can be present in a stabiliser composition according to the invention in an amount of up to approximately 30% by weight, for example up to approximately 10% by weight.

Also suitable as additives are, for example, sterically hindered amines, such as those mentioned on pages 7 to 27 of EP-A 1 046 668. Reference is expressly made to the sterically hindered amines disclosed therein, the compounds mentioned therein being regarded as part of the disclosure of this text.

The sterically hindered amines suitable as additives can be present in a stabiliser composition according to the invention in an amount of up to approximately 30% by weight, for example up to approximately 10% by weight.

Also suitable as additives in the stabiliser compositions according to the invention are hydrotalcites, zeolites and alkali alumocarbonates. Suitable hydrotalcites, zeolites and alkali alumocarbonates are described, for example, on pages 27 to 29 of EP-A 1 046 668, on pages 3, 5 and 7 of EP-A 256 872, on pages 2 and 3 of DE-C 41 06 411 and on pages 2 and 3 of DE-C 41 06 404. Reference is expressly made to those specifications, and their disclosure at the indicated places is regarded as being part of the disclosure of this text.

The hydrotalcites, zeolites and alkali alumocarbonates suitable as additives can be present in a stabiliser composition according to the invention in an amount of up to approximately 50% by weight, for example up to approximately 30% by weight.

Also suitable as additives in the context of the stabiliser compositions according to the invention are, for example, hydrocalumites of the general formula V

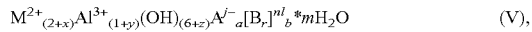

$$M^{2+}_{(2+x)}Al^{3+}_{(1+y)}(OH)_{(6+z)}A^{j-}{}_{a}[B_r]^{rl-}{}_{b} * mH_2O \qquad (V),$$

wherein M is calcium, magnesium or zinc or a mixture of two or more thereof, A is a j-valent inorganic or organic acid anion, j is 1, 2 or 3, B is an inorganic or organic acid anion other than A, r is a whole number $\geq 1$ and, when is r>1, indicates the degree of polymerisation of the acid anion, and l is 1, 2, 3 or 4 and indicates the valency of the acid anion, where, for r=1, l is 2, 3 or 4 and, for r>1, l indicates the valency of the individual monomer units of the polyanion and is 1, 2, 3 or 4 and rl indicates the total valency of the polyanion, and the following rules apply to the parameters x, y, a, b, r, z and j:

$0 \leq x < 0.6$,
$0 \leq y < 0.4$, where either x=0 or y=0,
$0 < a < 0.8/r$ and
$z = 1 + 2x + 3y - ja - r/b$.

Within the scope of a preferred embodiment of the present invention, as additives there are used compounds of the general formula V wherein M is calcium, which may be in admixture with magnesium or zinc or magnesium and zinc.

In the general formula V, A is an r-valent inorganic or organic acid anion, wherein r is 1, 2 or 3. Examples of acid anions present in the context of hydrocalumites suitable for use according to the invention are halide ions, $SO_3^{2-}$, $SO_4^{2-}$, $S_2O_3^{2-}$, $S_2O_4^{2-}$, $HPO_3^{2-}$, $PO_4^{3-}$, $CO_3^{2-}$, alkyl and dialkyl phosphates, alkyl mercaptides and alkyl sulfonates, wherein the alkyl groups may be identical or different, straight-chain, branched or cyclic and preferably have from 1 to about 20 carbon atoms. Also suitable as acid anions A are the anions of optionally functionalised di-, tri- or tetra-carboxylic acids, such as maleate, phthalate, aconitate, trimesate, pyromellitate, maleate, tartrate, citrate and also anions of the isomeric forms of hydroxyphthalic acid or hydroxymesic acid. Within the scope of a preferred embodiment of the present invention, A is an inorganic acid anion, especially a halide ion, for example F$^-$, Cl$^-$ or Br$^-$, preferably Cl$^-$.

In the general formula V, B is an acid anion other than A. For the case where r in the general formula V is the number 1, the letter B denotes an 1-valent inorganic or organic acid anion, wherein l is the number 2, 3 or 4. Examples of acid anions B present in the context of compounds of the general formula V suitable for use according to the invention are, for example, $O^{2-}$, $SO_3^{2-}$, $SO_4^{2-}$, $S_2O_3^{2-}$, $S_2O_4^{2-}$, $HPO_3^{2-}$, $PO_4^{3-}$, $CO_3^{2-}$, alkyl and dialkyl phosphates, alkyl mercaptides and alkyl sulfonates, wherein the alkyl groups may be identical or different, straight-chained or branched or cyclic and preferably have from 1 to about 20 carbon atoms. Also suitable as acid anions A are the anions of optionally functionalised di-, tri- or tetra-carboxylic acids, such as maleate, phthalate, aconitate, trimesate, pyromellitate, maleate, tartrate, citrate, and also anions of the isomeric forms of hydroxyphthalic acid or hydroxymesic acid. B in the context of the present invention in formula V is preferably a borate or an anion of an optionally functionalised di-, tri- or tetra-carboxylic acid. Special preference is given to carboxylic acid anions and anions of hydroxycarboxylic acids having at least two carboxyl groups, very special preference being given to citrates.

For the case where r in the general formula V is a number greater than 1, the term $[B_r]^{rl-}$ denotes an inorganic or organic polyanion having a degree of polymerisation r and the valency l of the individual monomer units of the polyanion with the total valency rl, wherein l is equal to or greater than 1. Examples of suitable polyanions $[B_r]^{rl-}$ are polyacrylates, polycarboxylates, polyborates, polysilicates, polyphosphates and polyphosphonates.

In all the above-mentioned cases, the acid anions A and B can be present in any desired ratio a/b in the compounds of the general formula V.

The compounds of the general formula V are not compounds having a layered structure of the hydrotalcite or hydrocalumite type but a physical mixture of $M^{2+}$/aluminium oxide hydrates with salts of divalent metals. X-ray diffractograms of the compounds of the general formula V used in the composition according to the invention clearly show that they are not discrete crystalline compounds of a known type but mixtures that are amorphous to X-rays.

For the preparation of the compounds according to the general formula V, following known procedures solutions or suspensions of oxidic forms of the desired cations (e.g. NaAlO$_2$, Ca(OH)$_2$, Zn(OH)$_2$, Al(OH)$_3$) can be mixed with solutions or suspensions of salts or the corresponding acids of the desired anions and reacted at temperatures of from 40 to 95° C., it being possible for the reaction times to be varied between 15 and 300 minutes.

When surface-treatment of the reaction products is desired, the surface-treatment medium can be added directly to the reaction products and the product can be separated from the mother liquor by filtration and dried at suitable temperatures between 100 and 250° C. The added amount of surface-treatment medium is, for example, from approximately 1 to approximately 20% by weight.

In the context of the stabiliser compositions according to the invention, compounds of the general formula V can be used in an amount of up to approximately 50% by weight, for example up to approximately 30% by weight or up to approximately 15% by weight.

Within the scope of a further embodiment of the present invention, a stabiliser composition according to the invention comprises at least one basic calcium salt. Suitable basic calcium salts are, for example, calcium oxide, calcium carbonate or, unless it is already a necessary constituent of the stabiliser compositions according to the invention, calcium hydroxide. The basic calcium salts may optionally have been surface-modified.

Also suitable as additives to the stabiliser composition according to the invention are metal oxides, metal hydroxides and metal soaps of saturated, unsaturated, straight-chain or branched, aromatic, cycloaliphatic or aliphatic carboxylic acids or hydroxycarboxylic acids having especially from about 2 to about 22 carbon atoms.

As metal cations, the metal oxides, metal hydroxides or metal soaps suitable as additives have especially a divalent cation; the cations of calcium or zinc or lead or mixtures of two or more thereof are especially suitable, but within the scope of a preferred embodiment of the present invention the stabiliser compositions according to the invention are zinc-free.

Examples of suitable carboxylic acid anions include anions of monovalent carboxylic acids, such as acetic acid, propionic acid, butyric acid, valeric acid, hexanoic acid, oenanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, lauric acid, isostearic acid, stearic acid, 12-hydroxystearic acid, 9,10-dihydroxystearic acid, oleic acid, 3,6-dioxaheptanoic acid, 3,6,9-trioxadecanoic acid, behenic acid, benzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid, sorbic acid, anions of divalent carboxylic acids or monoesters thereof, such as oxalic acid, malonic acid, maleic acid, tartaric acid, cinnamic acid, mandelic acid, malic acid, glycolic acid, oxalic acid, salicylic acid, polyglycoldicarboxylic acids having a degree of polymerisation of from approximately 10 to approximately 12, phthalic acid, isophthalic acid, terephthalic acid or hydroxyphthalic acid, anions of tri- or tetra-valent carboxylic acids or mono-, di- or tri-esters thereof, as in hemimellitic acid, trimellitic acid, pyromellitic acid or citric acid, and also so-called overbased carboxylates as described, for example, in DE-A 41 06 404 or DE-A 40 02 988, the disclosure of the last-mentioned documents being regarded as part of the disclosure of this text.

Within the scope of a preferred embodiment of the present invention there are used as additives metal soaps having anions derived from saturated or unsaturated carboxylic acids or hydroxycarboxylic acids having from about 8 to about 20 carbon atoms. Special preference is given to stearates, oleates, laurates, palmitates, behenates, versatates, hydroxystearates, dihydroxystearates, p-tert-butyl benzoates or (iso) octanoates of calcium or zinc or mixtures of two or more thereof. Within the scope of a further preferred embodiment of the present invention, a stabiliser composition according to the invention has calcium stearate or zinc stearate or a mixture thereof.

A stabiliser composition according to the invention can comprise the mentioned metal oxides, metal hydroxides or metal soaps, or a mixture of two or more thereof, in an amount of up to approximately 50% by weight, for example in an amount of up to approximately 30% by weight.

A stabiliser composition according to the invention can furthermore comprise as thermostabiliser component an organotin compound or a mixture of two or more organotin compounds. Suitable organotin compounds are, for example, methyltin-tris(isooctyl-thioglycolate), methyltin-tris(isooctyl-3-mercaptopropionate), methyltin-tris(isodecyl-thioglycolate), dimethyltin-bis(isooctyl-thioglycolate), dibutyltin-bis(isooctyl-thioglycolate), monobutyltin-tris(isooctyl-thioglycolate), dioctyltin-bis(isooctyl-thioglycolate), monooctyltin-tris(isooctyl-thioglycolate) or dimethyltin-bis (2-ethylhexyl-β-mercaptopropionate).

Furthermore, in the context of the stabiliser compositions according to the invention it is possible to use the organotin compounds which are mentioned and the preparation of which is described on pages 18 to 29 of EP-A 0 742 259. Reference is expressly made to the above-mentioned disclosure, the compounds mentioned therein and their preparation being understood as being part of the disclosure of this text.

A stabiliser composition according to the invention can comprise the described organotin compounds in an amount of up to approximately 20% by weight, especially up to approximately 10% by weight.

Within the scope of a further embodiment of the present invention, a stabiliser composition according to the invention can comprise organic phosphite esters having from 1 to 3 organic radicals, two or more of which radicals may be identical or all of which may be different. Suitable organic radicals are, for example, linear or branched, saturated or unsaturated alkyl radicals having from 1 to 24 carbon atoms, unsubstituted or substituted alkyl radicals having from 6 to 20 carbon atoms or unsubstituted or substituted aralkyl radicals having from 7 to 20 carbon atoms. Examples of suitable organic phosphite esters are tris(nonylphenyl), trilauryl, tributyl, trioctyl, tridecyl, tridodecyl, triphenyl, octyldiphenyl, dioctylphenyl, tri(octylphenyl), tribenzyl, butyldicresyl, octyl-di(octylphenyl), tris(2-ethylhexyl), tritolyl, tris(2-cyclohexylphenyl), tri-α-naphthyl, tris(phenylphenyl), tris(2-phenylethyl), tris(dimethylphenyl), tricresyl or tris(p-nonylphenyl) phosphite or tristearyl sorbitol-triphosphite or mixtures of two or more thereof.

A stabiliser composition according to the invention can comprise the described phosphite compounds in an amount of up to approximately 30% by weight, especially up to approximately 10% by weight.

A stabiliser composition according to the invention can also comprise as additives blocked mercaptans, as mentioned on pages 4 to 18 of EP-A 0 742 259. Reference is expressly made to the disclosure in the specification indicated, which is understood as being part of the disclosure of this text.

A stabiliser composition according to the invention can comprise the described blocked mercaptans in an amount of up to approximately 30% by weight, especially up to approximately 10% by weight.

A stabiliser composition according to the invention can also comprise lubricants, such as paraffin waxes, polyethylene waxes, polypropylene waxes, montan waxes, ester lubricants, such as fatty acid esters, purified or hydrogenated natural or synthetic triglycerides or partial esters, amide waxes, chloroparaffins, glycerol esters or alkaline earth soaps. Lubricants suitable for use are also described in "Kunststoffadditive", R. Gächter/H. Müller, Carl Hanser Verlag, 3rd edition, 1989, pages 478-488. Also suitable as lubricants are, for example, fatty ketones, as described in DE 4,204,887, and also silicone-based lubricants, as mentioned, for example, in EP-A 0 259 783, or combinations thereof, as mentioned in EP-A 0 259 783. Reference is expressly made to the mentioned documents, the disclosure of which relating to lubricants is to be regarded as being part of the disclosure of this text. Especially suitable in the context of the present invention are lubricants of the product range Baerolub® from Baerlocher GmbH (Unterschleißheim, Germany).

A stabiliser composition according to the invention can comprise the described lubricants in an amount of up to approximately 70% by weight, especially up to approximately 40% by weight.

Also suitable as additives for stabiliser compositions according to the present invention are organic plasticisers.

Suitable as plasticisers are, for example, compounds from the group of phthalic acid esters, such as dimethyl, diethyl, dibutyl, dihexyl, di-2-ethylhexyl, di-n-octyl, diisooctyl, diisononyl, diisodecyl, dicyclohexyl, dimethylcyclohexyl, dimethyl glycol, dibutyl glycol, benzylbutyl or diphenyl phthalate and also mixtures of phthalates, for example mixtures of alkyl phthalates having from 7 to 9 or 9 to 11 carbon atoms in the ester alcohol or mixtures of alkyl phthalates having from 6 to 10 and 8 to 10 carbon atoms in the ester alcohol. Especially suitable in the sense of the present invention are dibutyl, dihexyl, di-2-ethylhexyl, di-n-octyl, diisooctyl, diisononyl, diisodecyl, diisotridecyl and benzylbutyl phthalate and also the mentioned mixtures of alkyl phthalates.

Also suitable as plasticisers are the esters of aliphatic dicarboxylic acids, especially the esters of adipic, azelaic or sebacic acid or mixtures of two or more thereof. Examples of such plasticisers are di-2-ethylhexyl adipate, diisooctyl adipate, diisononyl adipate, diisodecyl adipate, benzylbutyl adipate, benzyloctyl adipate, di-2-ethylhexyl azelate, di-2-ethylhexyl sebacate and diisodecyl sebacate. Within the scope of a further embodiment of the present invention preference is given to di-2-ethylhexyl acetate and diisooctyl adipate.

Also suitable as plasticisers are trimellitic acid esters, such as tri-2-ethylhexyl trimellitate, triisotridecyl trimellitate, triisooctyl trimellitate and also trimellitic acid esters having from 6 to 8, 6 to 10, 7 to 9 or 9 to 11 carbon atoms in the ester group or mixtures of two or more of the mentioned compounds.

Suitable plasticisers are also, for example, polymer plasticisers, as mentioned in "Kunststoffadditive", R. Gächter/H. Müller, Carl Hanser Verlag, 3rd edition, 1989, chapter 5.9.6, pages 412-415, or "PVC Technology", W. V. Titow, 4th Edition, Elsevier Publishers, 1984, pages 165-170. The starting materials most commonly used for the preparation of polyester plasticisers are, for example, dicarboxylic acids, such as adipic, phthalic, azelaic or sebacic acid, and diols, such as 1,2-propanediol, 1,3-butanediol, 1,4-butanediol, 1,6-hexanediol, neopentyl glycol or diethylene glycol or mixtures of two or more thereof.

Also suitable as plasticisers are phosphoric acid esters, such as those in "Taschenbuch der Kunststoffadditive", chapter 5.9.5, pages 408-412. Examples of suitable phosphoric acid esters are tributyl phosphate, tri-2-ethylbutyl phosphate, tri-2-ethylhexyl phosphate, trichloroethyl phosphate, 2-ethyl-hexyl-di-phenyl phosphate, triphenyl phosphate, tricresyl phosphate or trixylenyl phosphate, or mixtures of two or more thereof.

Also suitable as plasticisers are chlorinated hydrocarbons (paraffins) or hydrocarbons as described in "Kunststoffadditive", R. Gächter/H. Müller, Carl Hanser Verlag, 3rd edition, 1989, chapter 5.9.14.2, pages 422-425, and chapter 5.9.14.1, page 422.

A stabiliser composition according to the invention can comprise the described plasticisers in an amount of up to approximately 99.5% by weight, especially up to approximately 30% by weight, up to approximately 20% by weight or up to approximately 10% by weight. Within the scope of a preferred embodiment of the present invention, the lower limit for the described plasticisers as constituent of the stabiliser compositions according to the invention is approximately 0.1% by weight or more, for example approximately 0.5% by weight, 1% by weight, 2% by weight or 5% by weight.

Pigments are also suitable as constituents of the stabiliser compositions according to the invention. Examples of suitable inorganic pigments are titanium dioxide, carbon black, $Fe_2O_3$, $Sb_2O_3$, $(Ba, Sb)O_2$, $Cr_2O_3$, spinels, such as cobalt blue and cobalt green, Cd (S, Se) or ultramarine blue. Suitable organic pigments are, for example, azo pigments, phthalocyanine pigments, quinacridone pigments, perylene pigments, diketopyrrolopyrrole pigments and anthraquinone pigments.

A stabiliser composition according to the invention can also comprise fillers, such as those described on pages 393 to 449 of "Handbook of PVC Formulating", E. J. Wickson, John Wiley & Sons, Inc., 1993, or reinforcing agents, such as those described on pages 549 to 615 of "Taschenbuch der Kunststoffadditive", R. Gächter/H. Müller, Carl Hanser Verlag, 1990. Especially suitable fillers or reinforcing agents are, for example, calcium carbonate (chalk), dolomite, wollastonite, magnesium oxide, magnesium hydroxide, silicates, glass fibres, talc, kaolin, chalk, carbon black or graphite, wood flour or other renewable raw materials. Within the scope of a preferred embodiment of the present invention, a stabiliser composition according to the invention comprises chalk.

Within the scope of a further embodiment of the present invention, the stabiliser compositions according to the invention can comprise antioxidants, UV absorbers and light stabilisers or blowing agents. Suitable antioxidants are described, for example, on pages 33 to 35 of EP-A 1 046 668. Antioxidants preferred in the context of the present invention are the products of the Irganox® range (manufacturer: Ciba Specialty Chemicals), for example Irganox® 1010 or 1076 or products of the Lowinox range from Great Lakes.

Suitable UV absorbers and light stabilisers are mentioned on pages 35 and 36 of EP-A 1 046 668. Reference is expressly made to both disclosures, the disclosures being regarded as part of this text.

Suitable blowing agents are, for example, organic azo and hydrazo compounds, tetrazoles, oxazines, isatoic anhydride, salts of citric acid, for example ammonium citrate, and also sodium carbonate and sodium hydrogen carbonate. Especially suitable are, for example, ammonium citrate, azodicarbonamide or sodium hydrogen carbonate or mixtures of two or more thereof.

A stabiliser composition according to the invention can also comprise impact strength modifiers and processing aids, gelling agents, antistatics, biocides, metal deactivators, optical brighteners, flame retardants and also antifogging compounds. Suitable compounds of those classes of compound are described, for example, in "Kunststoff Additive", R. Keβler/H. Müller, Carl Hanser Verlag, 3rd edition, 1989 and also in "Handbook of PVC Formulating", E. J. Wilson, J. Wiley & Sons, 1993.

For the preparation of the stabiliser composition according to the invention, an aqueous solution of a salt of a halogen-containing oxy acid or a mixture of two or more such salts is reacted with an inorganic or organic acid anhydride or with an inorganic base anhydride.

The present invention therefore relates also to a process for the preparation of a stabiliser composition for halogen-containing polymers wherein an aqueous solution of a halogen-containing oxy acid, or a mixture of two or more halogen-containing oxy acids, is reacted with an inorganic or organic acid anhydride or an inorganic base anhydride, or with a mixture of two or more thereof, to form a reaction product.

For this purpose, within the scope of a first embodiment of the present invention an inorganic or organic acid anhydride or an inorganic base anhydride or a mixture of two or more inorganic or organic acid anhydrides or a mixture of two or more inorganic base anhydrides is prepared in powder form. The process according to the invention may, however, equally be carried out with a mixture of one or more inorganic acid anhydrides and one or more inorganic base anhydrides.

The powders used in the context of the process according to the invention preferably have an average particle size of less than approximately 100 µm, especially less than approximately 60 µm and more especially less than approximately 40 µm.

For carrying out the process according to the invention, one of the above-mentioned anhydride compounds or one of the above-mentioned mixtures is reacted with an aqueous solution of a salt of a halogen-containing oxy acid or a mixture of two or more such salts. The reaction is carried out in the context of the process according to the invention in such a manner that the anhydride reacts with the water supplied by the aqueous solution of the halogen-containing salt of the oxy acid or the mixture of two or more of those acids, to form the respective acid or base.

The conditions prevailing during the reaction can be chosen substantially as desired, provided that reaction of the anhydride in question is effected by the water of the aqueous solution. For example, temperatures of from approximately 0 to approximately 100° C., especially temperatures of from approximately 20 to approximately 80° C., may be used for the reaction. Within the scope of a preferred embodiment of the present invention, the components participating in the reaction are so chosen that the reaction can be carried out substantially at room temperature.

It is provided for according to the invention, however, that the temperature rises during the reaction, for example as a result of an exothermic nature of the reaction itself.

The reaction of the pulverulent component with the aqueous solution can be effected in principle in any desired way, provided that sufficient intermixing of powder and aqueous solution is ensured. For example, customary mixing apparatus, such as broom-type mixers or ploughshare mixers, are suitable for carrying out the process according to the invention. Especially suitable, however, are processes that result in an especially fine distribution of the components that react with one another, for example fluidised bed methods, spray tower methods or jet stream methods.

The process according to the invention can also be carried out, for example, as a combination of mixing and grinding processes. In that case, for example during the grinding of an anhydride or a mixture of two or more anhydrides, as described above, an aqueous solution of a salt of a halogen-containing oxy acid or a mixture of two or more such salts can be supplied in the context of the grinding operation.

When a stabiliser composition according to the invention is to comprise one or more additives in addition to the two main components, those additives can be added to the stabiliser composition before, during or after the reaction of the aqueous solution with the anhydride or anhydrides. Addition of additives before or during the reaction should take place only if the additives are inert towards the compounds participating in the reaction. Otherwise, namely when the additives are not inert, they are added (where the stabiliser composition according to the invention is to comprise such additives) only after the reaction.

Within the scope of a preferred embodiment of the present invention, for carrying out the process according to the invention the anhydride components and the aqueous solution are used in a molar ratio of anhydride:water such as 1:1 or greater than 1:1, for example from 1.1:1 to about 1.5:1.

The stabiliser compositions according to the invention are suitable for the stabilisation of halogen-containing polymers.

Examples of such halogen-containing polymers are polymers of vinyl chloride, vinyl resins containing vinyl chloride units in the polymer backbone, copolymers of vinyl chloride and vinyl esters of aliphatic acids, especially vinyl acetate, copolymers of vinyl chloride with esters of acrylic and methacrylic acid or acrylonitrile or mixtures of two or more thereof, copolymers of vinyl chloride with diene compounds or unsaturated dicarboxylic acids or anhydrides thereof, for example copolymers of vinyl chloride with diethyl maleate, diethyl fumarate or maleic anhydride, post-chlorinated polymers and copolymers of vinyl chloride, copolymers of vinyl chloride and vinylidene chloride with unsaturated aldehydes, ketones and other compounds such as acrolein, crotonaldehyde, vinyl methyl ketone, vinyl methyl ether, vinyl isobutyl ether and the like, polymers and copolymers of vinylidene chloride with vinyl chloride and other polymerisable compounds, such as those already mentioned above, polymers of vinyl chloroacetate and dichlorodivinyl ether, chlorinated polymers of vinyl acetate, chlorinated polymeric esters of acrylic acid and $\alpha$-substituted acrylic acids, chlorinated polystyrenes, for example polydichlorostyrene, chlorinated polymers of ethylene, polymers and post-chlorinated polymers of chlorobutadiene and copolymers thereof with vinyl chloride and also mixtures of two or more of the mentioned polymers or polymer mixtures that contain one or more of the above-mentioned polymers. Within the scope of a preferred embodiment of the present invention, the stabiliser compositions according to the invention are used for the production of moulded articles of PVC-U, such as window profiles, industrial profiles, tubes and plates.

Also suitable for stabilisation with the stabiliser compositions according to the invention are the graft polymers of PVC with EVA, ABS or MBS. Preferred substrates for such graft copolymers are also the afore-mentioned homo- and co-polymers, especially mixtures of vinyl chloride homopolymers with other thermoplastic or elastomeric polymers, especially blends with ABS, MBS, NBR, SAN, EVA, CPE; MBAS, PAA (polyalkyl acrylate), PAMA (polyalkyl methacrylate), EPDM, polyamides or polylactones.

Likewise suitable for stabilisation with the stabiliser compositions according to the invention are mixtures of halogenated and non-halogenated polymers, for example mixtures of the above-mentioned non-halogenated polymers with PVC, especially mixtures of polyurethanes and PVC.

Furthermore, it is also possible for recyclates of chlorine-containing polymers to be stabilised with the stabiliser compositions according to the invention, in principle any recyclates of the above-mentioned halogenated polymers being suitable for this purpose. PVC recyclate, for example, is suitable in the context of the present invention.

The present invention therefore relates also to a polymer composition at least comprising a halogenated polymer and a stabiliser composition according to the invention.

Within the scope of a preferred embodiment of the present invention, a polymer composition according to the invention comprises the stabiliser composition according to the invention in an amount of from 0.1 to 20 phr, especially from approximately 0.5 to approximately 15 phr or from approximately 1 to approximately 12 phr. The unit phr represents "per hundred resin" and thus relates to parts by weight per 100 parts by weight of polymer.

A polymer composition according to the invention preferably comprises as halogenated polymer at least a proportion of PVC, the PVC content being especially at least approximately 20% by weight, preferably at least approximately 50% by weight, for example at least approximately 80% by weight or at least approximately 90% by weight.

The present invention relates also to a method of stabilising halogen-containing polymers in which a halogen-containing polymer or a mixture of two or more halogen-containing polymers or a mixture of one or more halogen-containing polymers and one or more halogen-free polymers is mixed with a stabiliser composition according to the invention.

The mixing together of polymer or polymers and the stabiliser composition according to the invention can in principle be effected at any time before or during the processing of the polymer. For example, the stabiliser composition can be mixed into the polymer, which is in powder or granule form, prior to processing. It is equally possible, however, to add the stabiliser composition to the polymer or polymers in the softened or molten state, for example during processing in an extruder, in the form of an emulsion or dispersion, in the form of a pasty mixture, in the form of a dry mixture or in the form of a solution or melt.

A polymer composition according to the invention can be brought into a desired form in known manner. Suitable methods are, for example, calendering, extrusion, injection-moulding, sintering, extrusion blowing or the plastisol process. A polymer composition according to the invention can also be used, for example, in the production of foamed materials. In principle, the polymer compositions according to the invention are suitable for the production of hard or soft PVC, especially for the production of PVC-U.

A polymer composition according to the invention can be processed to form moulded articles. The present invention therefore relates also to moulded articles, at least comprising a stabiliser composition according to the invention or a polymer composition according to the invention.

The term "moulded article" in the context of the present invention in principle includes any three-dimensional structures that can be produced from a polymer composition according to the invention. In the context of the present invention the term "moulded article" includes, for example, wire sheathings, automobile components, for example automobile components such as are used in the interior of the automobile, in the engine space or on the outer surfaces, cable insulators, decorative films, agricultural films, hoses, shaped sealing elements, office films, hollow bodies (bottles), packaging films, (deep-draw films), blown films, tubes, foamed materials, heavy duty profiles (window frames), light wall profiles, structural profiles, sidings, fittings, plates, foamed panels, co-extrudates having a recycled core, or housings for electrical apparatus or machinery, for example computers or household appliances.

Further examples of moulded articles that can be produced from a polymer composition according to the invention are synthetic leather, floor coverings, textile coatings, wallcoverings, coil coatings and underseals for motor vehicles.

The invention is explained in greater detail below by Examples.

EXAMPLES 1. 7.14 g of an aqueous solution of 70% by weight sodium perchlorate in water were mixed with 45 g of calcium hydroxide (particle size $D_{50}$: 6.5 μm) and the mixture was then dried (combination 3). An electron-microscopic investigation of the dried mixture showed crystallites having a size of up to 10 μm. By recording an X-ray diffractogram (Cu/K α-radiation) of the mixture, a reflex at 2 theta=25.14° demonstrated the presence of crystalline sodium perchlorate.

2. 7.14 g of an aqueous solution of 70% by weight sodium perchlorate in water were reacted with a mixture of 6.66 g of calcium oxide (particle size $D_{50}$: 14.5 μm) and 36.2 g of calcium hydroxide (particle size $D_{50}$: 6.5 μm) (combination 1). An electron-microscopic investigation of the mixture demonstrated no definite crystallites of sodium perchlorate. The recording of an X-ray diffractogram showed no reflex at 2 theta=25.14°, so demonstrating the absence of crystalline sodium perchlorate having a crystallite size greater than 5 nm.

For testing the effectiveness of the stabiliser compositions according to the invention, a formulation according to the invention and two comparison formulations (formulations 2 and 3) were prepared and their effectiveness tested. A mixture of sodium perchlorate and calcium hydroxide, obtained by mixing the two constituents together in the dry state, was used as combination 2. The particle size of the constituents calcium hydroxide and sodium perchlorate contained in combination 2 was respectively approximately 6.4 μm and approximately 15 μm.

The following formulations were used:

|  | Formulation 1 | Formulation 2 | Formulation 3 |
|---|---|---|---|
| PVC | 100 | 100 | 100 |
| Chalk | 2.1 | 2.1 | 2.1 |
| Titanium dioxide | 0.1 | 0.1 | 0.1 |
| Calcium stearate (Ceasit SW) | 0.5 | 0.5 | 0.5 |
| Paraffin wax (e.g. BL* LKT) | 0.6 | 0.6 | 0.6 |
| PE wax (e.g. BL* PA) | 0.5 | 0.5 | 0.5 |
| Oxidised PE wax (e.g. BL* PA 25) | 0.1 | 0.1 | 0.1 |
| Calcium hydroxide | 0.2 | 0.2 | 0.2 |
| Hydrocalumite | 0.6 | 0.6 | 0.6 |
| BGAC | 0.3 | 0.3 | 0.3 |
| Combination 1 | 0.2 |  |  |
| Combination 2 |  | 0.2 |  |
| Combination 3 |  |  | 0.2 |

*BL = Baerolub

PVC and each of the above-mentioned formulations were used to produce rolled sheets at 190° C. (rolling time 3 minutes). The resulting PVC sheets were tested in a Congo red test according to DIN VDE 0472 Part 614 and their heat stability was tested in a Mathis oven at 200° C. with advance every 5 minutes, followed by visual assessment of quality. The following results were obtained:

|  | Formulation 1 | Formulation 2 | Formulation 3 |
|---|---|---|---|
| Congo red test | 24 minutes | 19 minutes | 22 minutes |
| Colour retention in the Mathis test | 1 | 3 | 2 |
| Initial colour | 1 | 1 | 2 |

1 = best score
6 = worst score

That which is claimed:

1. A process for the preparation of a stabiliser composition for halogen-containing polymers, comprising the step of reacting an aqueous solution comprising water and one or more salts of a halogen-containing oxy acid of the general formula $M(ClO_4)_k$, wherein M is Li, Na, K, Mg, Ca, Sr, Zn, Al, La, Ce, or an ammonium cation of the general formula $NR_4^+$, the radicals R are each independently of the others H or a linear or branched alkyl radical having from 1 to about 10 carbon atoms and k, according to the valency of M, is the number 1, 2, or 3, with at least one anhydride selected from the group consisting of inorganic acid anhydrides, organic acid anhydrides, inorganic base anhydrides, and mixtures thereof, in an exothermic reaction, to form a solid product comprising (1) the reaction product of water from the aqueous solution and the at least one anhydride and (2) one or more salts of the halogen-containing oxy acid in the form of crystallites, wherein less than 10% by weight of the crystallites of the one or more salts of the halogen-containing oxy acid have a crystallite size greater than 3 μm, based on the total content of the one or more salts of the halogen-containing oxy acid in the solid product.

2. The process according to claim 1, wherein an inorganic base is formed during said reacting step.

3. The process according to claim 1, wherein the aqueous solution comprises at least 10% by weight of one or more salts of halogen-containing oxy acids.

4. The process according to claim 1, wherein less than 10% by weight of the crystallites of the one or more salts of the halogen-containing oxy acid have a crystallite size greater than 200 nm, based on the total content of the one or more salts of the halogen-containing oxy acid.

5. The process according to claim 1, further comprising the step of mixing the reaction product with one or more additives.

6. A solid stabiliser composition prepared according to the process of claim 1.

7. A polymer composition comprising a stabiliser composition according to claim 6.

8. A process for the preparation of a stabiliser composition for halogen-containing polymers, comprising the step of reacting an aqueous solution comprising water and one or more salts of a halogen-containing oxy acid of the general formula $M(ClO_4)_k$, wherein M is Li, Na, K, Mg, Ca, Sr, Zn, Al, La, Ce, or an ammonium cation of the general formula $NR_4^+$, the radicals R are each independently of the others H or a linear or branched alkyl radical having from 1 to about 10 carbon atoms and k, according to the valency of M, is the number 1, 2, or 3, with at least one anhydride selected from the group consisting of inorganic acid anhydrides, organic acid anhydrides, inorganic base anhydrides, and mixtures thereof, wherein the at least one anhydride includes at least one inorganic base anhydride, in an exothermic reaction, to form a solid product comprising (1) the reaction product of water from the aqueous solution and the at least one anhydride and (2) one or more salts of the halogen-containing oxy acid in the form of crystallites, wherein less than 10% by weight of the crystallites of the one or more salts of the halogen-containing oxy acid have a crystallite size greater than 3 μm, based on the total content of the one or more salts of the halogen-containing oxy acid in the solid product.

9. The process according to claim 8, wherein an inorganic base is formed during said reacting step.

10. The process according to claim 8, wherein the aqueous solution comprises at least 10% by weight of one or more salts of halogen-containing oxy acids.

11. The process according to claim 8, wherein less than 10% by weight of the crystallites of the one or more salts of the halogen-containing oxy acid have a crystallite size greater than 200 nm, based on the total content of the one or more salts of the halogen-containing oxy acid.

12. The process according to claim 8, further comprising the step of mixing the reaction product with one or more additives.

13. A solid stabiliser composition prepared according to the process of claim 8.

14. A polymer composition comprising a stabiliser composition according to claim 13.

* * * * *